United States Patent [19] [11] 3,968,705
Amano et al. [45] July 13, 1976

[54] OVERLOAD SAFETY DEVICE
[75] Inventors: Hitoshi Amano, Tokyo; Yoshifumi Tsuchiya, Ohme, both of Japan
[73] Assignee: Takayuki Nomura, Tokyo, Japan
[22] Filed: Jan. 10, 1975
[21] Appl. No.: 540,243

[52] U.S. Cl. .................. 74/424.8 R; 74/412 TA; 82/27; 408/11
[51] Int. Cl.² .................. F16H 1/18; B23B 21/00
[58] Field of Search .......... 82/27, 22, 21 B, 34 A, 82/21 R; 408/11, 710, 6; 74/412 TA, 424.8 R

[56] References Cited
UNITED STATES PATENTS
3,339,426  9/1967  Borggrafe .................. 74/412 TA
3,816,016  6/1974  Schatzman .................. 408/11
FOREIGN PATENTS OR APPLICATIONS
970,564  10/1958  Germany .................. 408/11

Primary Examiner—Leonidas Vlachos
Attorney, Agent, or Firm—Fidelman, Wolffe & Waldron

[57] ABSTRACT

An overload safety device is provided for use on a feed mechanism to control the feed of such devices as a headstock, tool rest, or rotary table. The overload safety device includes a mounting means for maintaining a feed screw in a fixed position with respect to an axis of rotation of the screw and for permitting the screw to move a predetermined distance along the axis in response to a load placed thereon. The safety device further includes control means responsive to the movement of the screw for producing a control signal when the movement of the screw exceeds the predetermined distance, thus indicating an overload condition.

4 Claims, 8 Drawing Figures

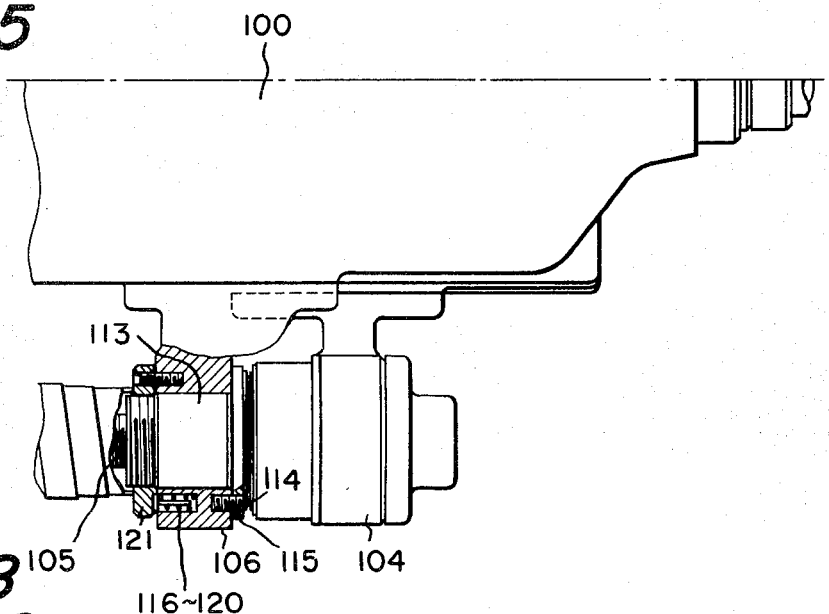
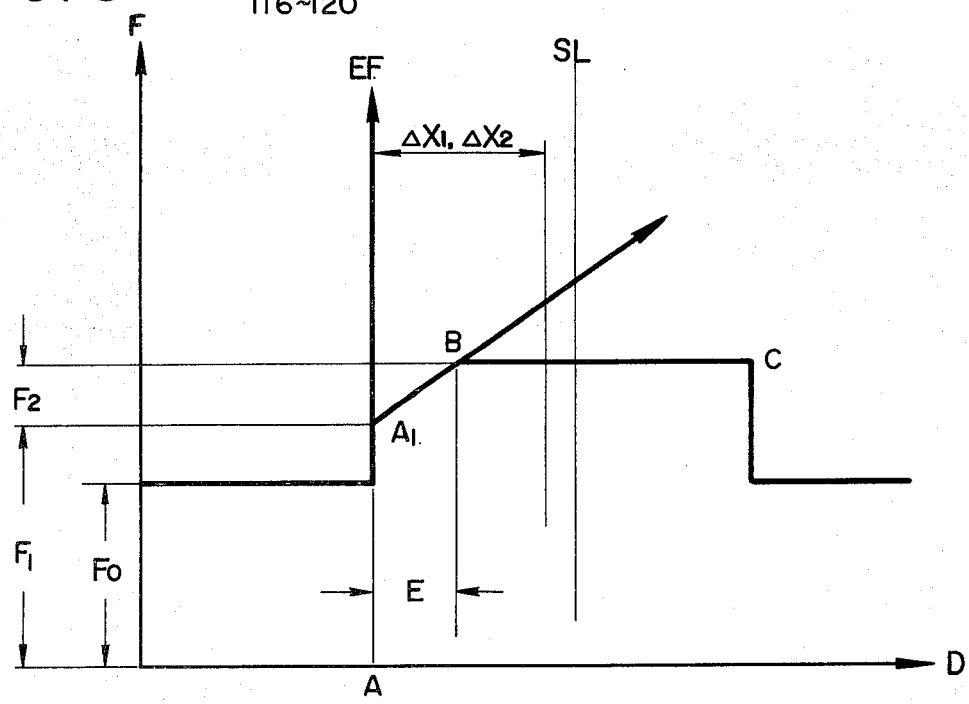

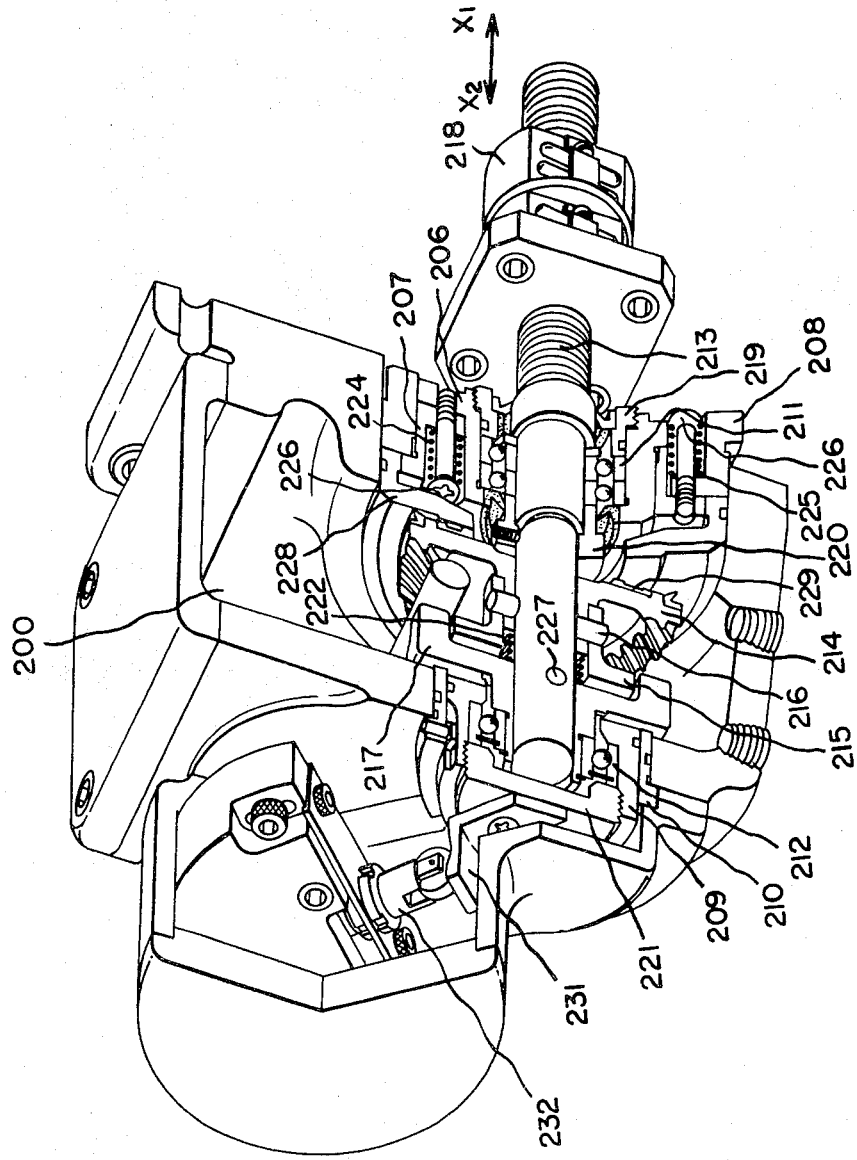

OVERLOAD SAFETY DEVICE

The present invention relates to an overload safety device in a feed mechanism which controls the feed of a headstock or tool rest by means of a feed screw and a feed nut or in a feed mechanism which controls the rotational feed of a rotary table by means of a worm and a worm screw. According to the overload safety device of the present invention when a thrust force is applied to a control system of the aforesaid mechanism, during the feed control, in the form of an abnormal thrust force, greater than a thrust force at the time of normal control, a stop instruction is sent to the control system independently of the position thereof.

It is an object of the present invention to provide a safety device wherein in the event that overload (e.g. loads occurred as a result of breakage of cutting tool during the feed control or as a result of impediment of work or tool to the control system and object to be controlled) during the feed control, the control system and object to be controlled (such as headstock, tool rest) may be protected and simultaneously therewith the feed control of the control system may be stopped.

It is a further object of the invention to provide a safety device wherein in the event that overload occurs during the feed control, the control system may be stopped independently of the position thereof.

It is another object of the invention to provide a safety device wherein the control system, stopped due to the occurrence of overload during the feed control, may be returned to its original condition with accuracy and in a short period of time after the cause of the overload has been eliminated.

It is yet another object of the invention to provide a safety device wherein thrust forces in a normal state required to control the cutting system and object to be controlled may suitably be determined.

Other objects, various advantages and effects of the invention will become apparent from the following description of embodiments with reference to the accompanying drawings in which:

FIG. 5 is a plan view of FIG. 4;

FIG. 7 is a sectional view taken on line A—A of FIG. 6; and

FIG. 8 illustrates the relationship between the thrust force in the device of the invention and the travel distance of the control system.

Preferred embodiments of the invention will now be described with reference to the accompanying drawings.

Figure 1:
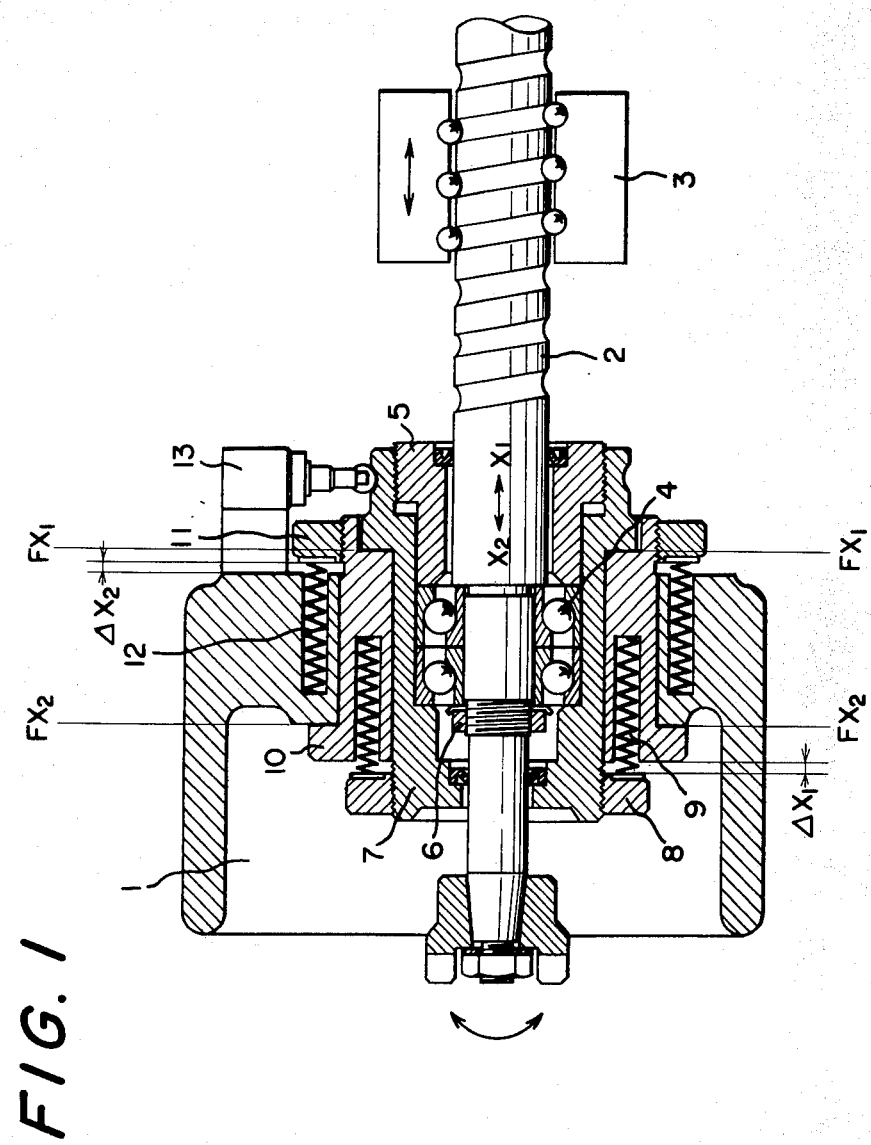
FIG. 1 is a plan view showing a principal part of an overload safety device in accordance with the present invention.

FIG. 1 illustrates the construction of an overload safety device in which rotational movement of a feed screw 2 causes linear movement of a feed nut 3 on the feed screw 2 in the direction of $X_1$ or $X_2$.

At this time, assume that a thrust force occurs in the axial direction of the feed screw 2 and feed nut 3.

The safety device of the present invention is designed so as to discriminate between continued control of the object to be controlled or stoppage according to the magnitude of the thrust force as mentioned above.

The feed screw 2 is only rotatably mounted relative to a sleeve 7 by means of a bearing 4 and bearing clamping members 5 and 6 so that it may receive an axial force (a thrust force) created in the feed screw 2.

On the other hand, on the sleeve 7 is mounted a sleeve 10. The sleeve 7 is slidably supported against the bearing 4 in an axial direction ($X_1$ direction) while the sleeve 10 is slidably supported by a body 1 against the bearing 4 in the opposite axial direction ($X_2$ direction).

Also, a sleeve 7 applies the thrust force in the $X_2$ direction positioned at the plane FX, or the sleeve 10 by action of a spring 9 guided by the sleeve 10, while the sleeve 10 applies a thrust force in the $X_1$ direction, positioned at the plane $FX_2$ on the body 1, by action of a spring 12 guided by the body 1.

Further, the thrust force (which is the thrust force in a normal state required to control the cutting and object to be controlled) in the $X_1$ direction to be applied onto the feed screw 2 may be set by means of a thrust adjusting nut 8, and the thrust force in the $X_2$ direction by means of a thrust adjusting nut 11.

Accordingly, the feed screw 2 is free to rotate with respect to the body 1 and is substantially fixed on the body 1 in the axial direction and may accurately control the feed nut 3 for a predetermined distance with respect to the thrust force in a normal state.

When an overload occurs during the control of an object to be controlled, to thereby apply an abnormal thrust force in the $X_1$ direction to the feed screw 2, the spring 9 would be compressed to cause the sleeve 7 to be moved by distance as indicated at $X_1$ within the sleeve 10 in the $X_1$ direction.

Also, when an overload is applied in the $X_2$ direction, the spring 12 would be compressed to cause sleeves 7 and 10 to be moved by distance as indicated at $X_2$ within the body 1 in the $X_2$ direction.

In the safety device of the present invention, an arched groove is formed in the sleeve 7 to give instructions that the abnormal thrust force has occurred, and movement of the sleeve 7 due to the abnormal thrust force may be detected by means of an instruction switch 13 to stop the control system.

The mode, in which the feed screw 2 is axially moved in the direction of $X_1$ or $X_2$ as a result of occurrence of trouble during the control of an object to be controlled, will hereinafter be described with reference to FIG. 8.

It may be apparent that the thrust force of the feed screw 2 will increase due to the occurrence of trouble.

When trouble has occurred at point A during the movement of object to be controlled, as shown in FIG. 8, the thrust force F of the feed screw 2 increases to cause damage to the object to be controlled, the control system and the external parts.

So, in order to check the increase of the thrust force F, the feed screw 2 is moved in the axial direction.

The feed screw 2 may be moved in the axial direction as indicated as at D by the sleeves 7 and 10, said sleeves 7 and 10 being capable of withstanding the thrust force $F_o$ in a normal state and axially biased by springs 9 and 12 set so as not to cause damage to the object to be controlled, the control system and external parts.

That has to say, when trouble is occurred at point A to raise the thrust force F up to a safety thrust force $F_1$ setting point or point $A_1$, the springs 9 and 12 which support the thrust force F applied to the sleeves 7 and 10 may not withstand the abnormal thrust force EF any longer, resulting in contraction thereof. The reference character SL designates an elastic limit of the springs.

Simultaneously therewith, the sleeves 7 and 10 initiate their movement by distance as indicated at E in the direction of $X_1$ or $X_2$.

The system is so designed that when the aforesaid movement of the sleeves reaches point B, the overload is detected to stop the control system.

As a result of this novel arrangement, regardless of the trouble that may occur, no thrust force in excess of $F_1 + F_2$ would be applied to the control system.

As a consequence, the load due to the trouble is not applied with a force in excess of $F_2$ to the object to be controlled, the control system and external parts, and damage thereto may sufficiently be prevented.

Figure 2:
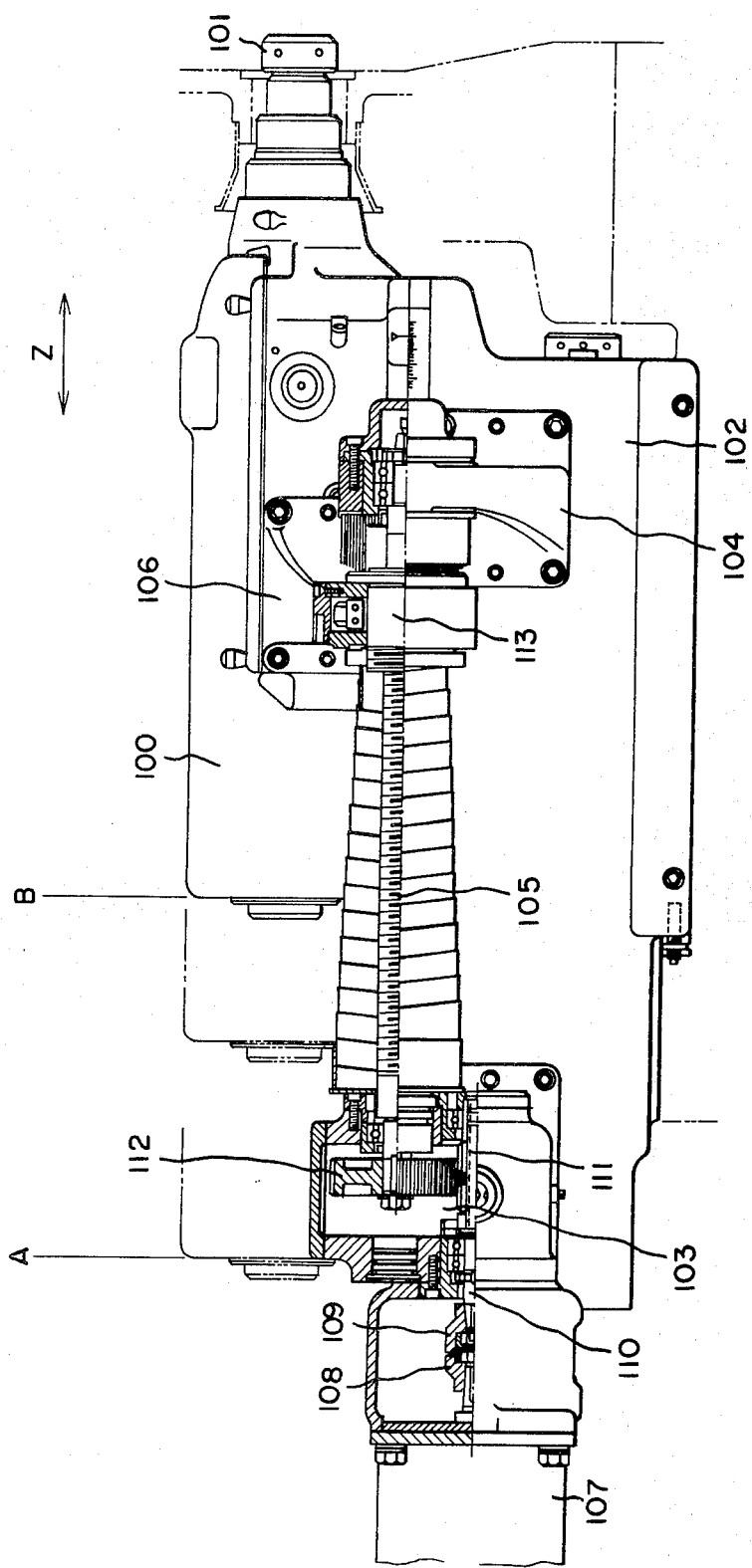
FIG. 2 is a front view in which the device of the invention is applied to a headstock feed mechanism of a spindle moving type screw machine.
Figure 3:
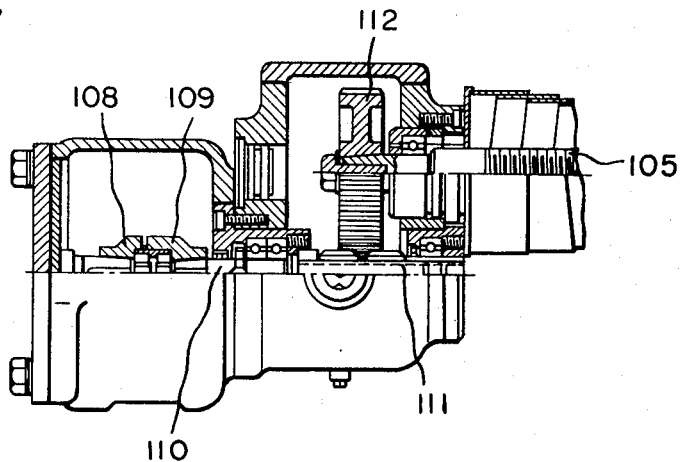
FIG. 3 is an enlarged view of a feed screw control of FIG. 2.

FIG. 2 illustrates an embodiment in which the device of the invention is applied to a feed mechanism of a headstock in a spindle moving type screw machine.

In the illustrated construction, a head stock 100 supports a spindle 101, and the workpiece may be held with the aid of a headstock guide 102 as a guide and moved by distance required for machining in the direction of Z between position A and position B to effect lengthwise cutting by use of tool.

A feed mechanism of the headstock 100 comprises a headstock feed gear box 103 secured to the headstock guide 102 and a headstock feed screw 105 supported by a feed screw bracket 104.

On the other hand, the headstock 100 is provided with a feed nut bracket 106 for supporting a feed nut 113, and it is so designed that the headstock 100 may be moved in the direction Z upon rotation of the headstock feed screw 105.

Further, the headstock feed screw 105 controls the movement of the headstock to a predetermined position with the aid of a headstock driving motor 107.

The output of the headstock drive motor 107 is transmitted through couplings 108 and 109 to a power transmission shaft 110 and to the headstock feed screw 105 by means of headstock feed toothed wheels 111 and 112 within the headstock feed gear box 103 to thereby control the movement of the headstock 100.

As seen in FIG. 5, in the headstock feed nut 113, a pin 114 is secured to the headstock feed screw bracket 106 mounted on the headstock 100 so as to lock rotation of the headstock feed nut 113, the pin 114 being received in an opening 115 made in the headstock feed nut 113.

From the above-description it is apparent that the headstock feed nut 113 may move the headstock 100 in the direction of Z upon rotation of the headstock feed screw 105.

Springs 116, 117, 118, 119 and 120 are retained within the headstock feed screw bracket 106 and are adapted to adjust the thrust force required for tool cutting, and to position the thrust direction of the headstock feed nut 113.

The normal thrust force of a tool may be adjusted by means of the present system so as to withstand the thrust force required for a particular tool cutting operation by means of a thrust adjusting screw 121 provided on the headstock feed nut 113.

In this manner, the headstock feed nut 113 is secured to the headstock feed screw basket 106 by means of the rotation step pin 114 and springs 116, 117, 118, and 119, and may accurately control the headstock 100 by a predetermined distance against the normal thrust force of a particular tool cutting.

If an overload should occur during the tool cutting operation to thereby apply an abnormal load to the drive system of the headstock 100, pressure is applied to the springs 116, 117, 118, 119 and 120 to render these springs undurable against the set force adjusted therefor, and for this reason, the headstock feed nut 113 is loaded with an overload and simultaneously moved within the headstock feed screw bracket 106 in the thrust direction of the thrust.

Figure 4:
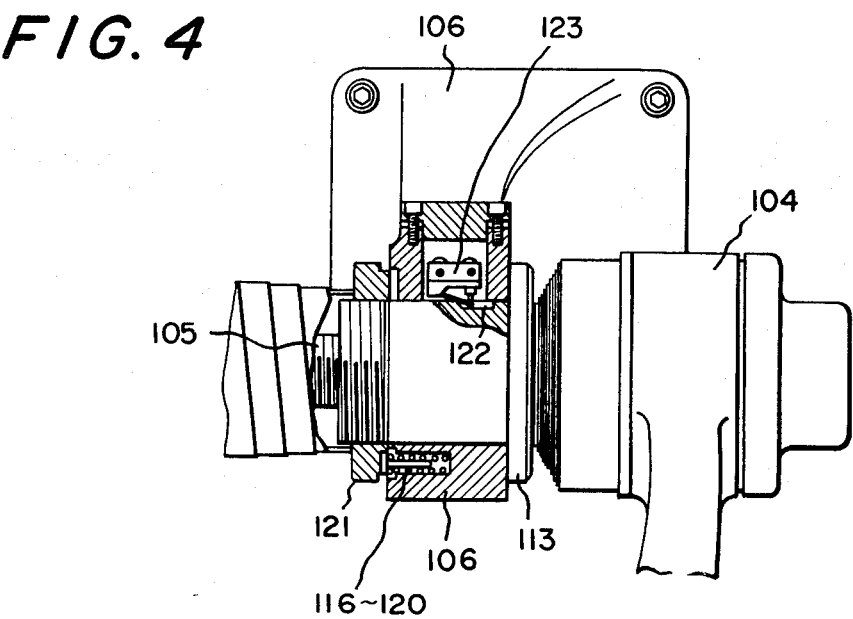
FIG. 4 is an enlarged view of the device according to the invention shown in FIG. 2.

However, the headstock feed nut 113 is provided, as shown in FIG. 4, with an arched groove 122 for transmitting overload instructions, and the headstock feed screw bracket 16 is provided with a switch 123 for receiving overload instructions, so that when the headstock 100 is loaded with an overload, the headstock feed nut 113 is moved within the headstock feed screw bracket 106 in the thrust direction to cause the arched groove 122 to activate the overload switch 123.

By means of the above described operation, the overload switch 123 detects the abnormal instructions and thereby stops the headstock driving motor 107 and the headstock drive systems, whereby various parts belonging to the drive systems are prevented from being damaged.

Now, another embodiment of the present invention, in which the feed control is at right angles to the feed screw, will be described with reference to FIGS. 6 and 7.

Figure 6:
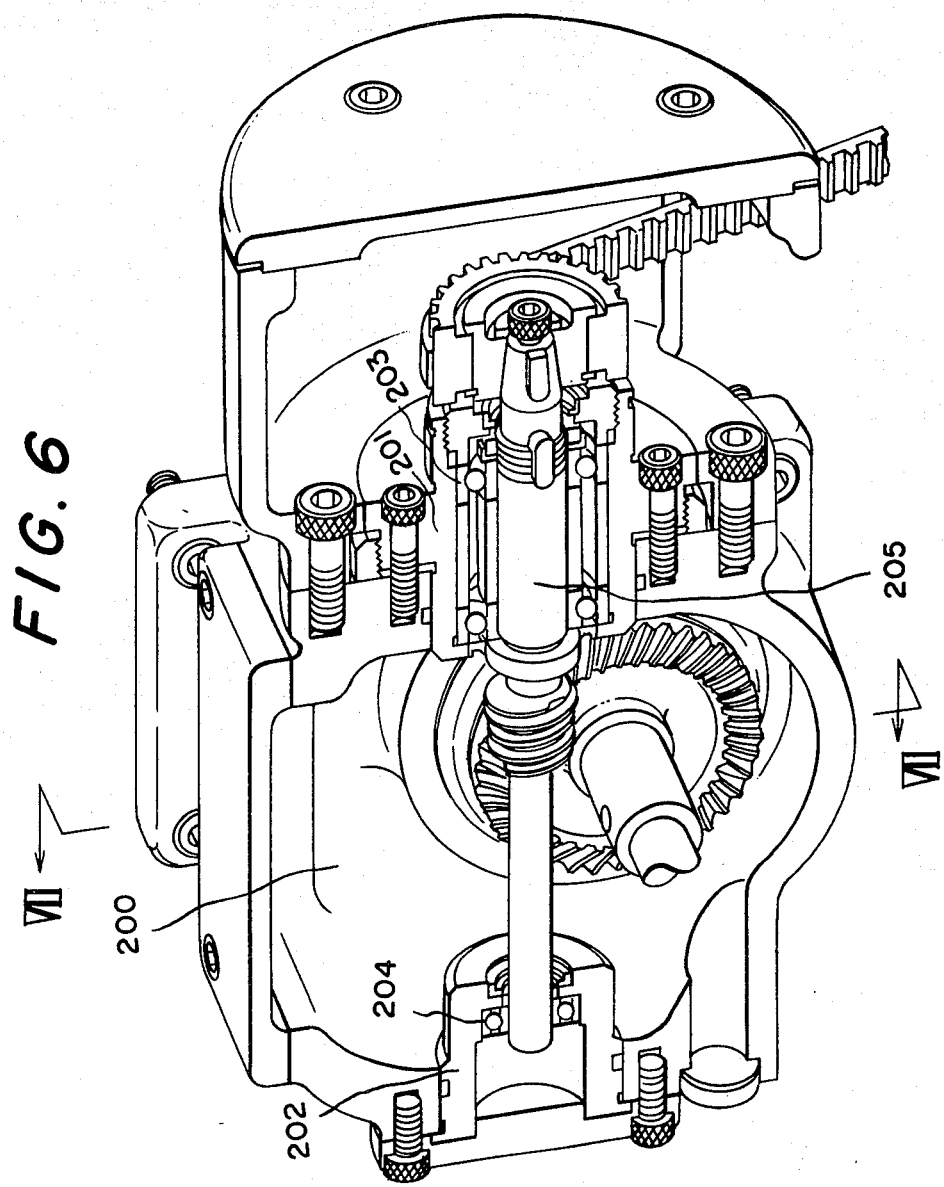
FIG. 6 is a perspective view showing another form of embodiment in which the feed screw control is at right angles to the feed screw.

FIGS. 6 and 7 show a feed screw control in which a drive shaft 205 is supported by sleeves 201, 202 and bearings 203, 204 within a gear box 200. A feed screw 213 is disposed at right angles to the drive shaft 205 and is supported by sleeves 206, 207, 208, 209, 210 and bearings 211, 212 within the gear box 200. The feed screw 213 has a toothed control wheel 214 axially mounted thereby.

A coupling 215 for connecting the feed screw 213 with the toothed wheel 214 is secured to the toothed wheel 214 on the feed screw 213 by means of a fixed pin 216, to thereby place the coupling 215 in engagement with a coupling 217 secured to the feed screw 213 by means of a fixed pin 227. A feed nut 218 is located on the feed screw 213. As a result, the drive shaft 205 is placed at right angles to the feed screw 213 to thereby permit axial control of the feed nut 218 on the feed screw 213.

The feed screw 213 is rotatably carried on the sleeves 206 and 209 by the bearings 211, 212 and bearing clamping members 219, 220 and 221. And any axial thrust force created in the feed screw 213 is received by the sleeve 206.

However, the sleeve 206 has thereon a sleeve 207 to slidably support the sleeve 206 in a first axial direction ($X_1$ direction). Likewise the sleeve 207 is slidably supported in an opposite axial direction ($X_2$ direction) by the sleeve 208 secured to the gear box 200.

A thrust force is applied to the sleeve 206 in the $X_2$ direction by means of a spring 224 guided by the sleeve 207 to provide an axial positioning with respect to the sleeve 207, while a thrust force is applied to the sleeve 207 in the $X_2$ direction by means of a spring 225 guided by the sleeve 208 to provide an axial positioning with respect to the sleeve 208.

The thrust forces applied by the springs 224 and 225 may be set to provide a thrust force required to control the object to be controlled (feed nut) by setting a spring adjusting screw 226.

Accordingly, the feed screw 213 may be secured to the gear box 200 so as to permit some sliding in the axial direction and may accurately control the object to be controlled by a predetermined distance against the thrust force occurring in the normal operation of the system.

When an overload occurs during the control of the object to be controlled to thereby apply a thrust force in $X_1$ direction to the feed screw 213, the spring 224 which has been adjusted so as to be durable against a normal thrust force becomes undurable against the abnormal thrust force thereof, and hence the sleeve 206 which has been positioned in the $X_1$ direction of the feed screw 213 is moved within the sleeve 207 in the $X_1$ direction.

Also, when a thrust force is applied in the $X_2$ direction, the spring 225 which has been adjusted so as to be durable against the thrust force in a normal state, becomes undurable against the thrust force in an abnormal state thereof, and hence the sleeve 207 which has been positioned in the $X_2$ direction of the feed screw 213 is moved within the sleeve 208 in the $X_2$ direction.

The toothed wheel 214 is axially positioned by a thrust bearing 229 to a sleeve 228 within the gear box 200 and stabilized by a spring 222.

In this manner, in the event that the feed screw 213 moves in the direction of $X_1$ or $X_2$, the toothed wheel 214 may always be stabilized to remove trouble from the toothed wheel 214.

When an abnormal thrust force occurs during the control of an object to be controlled, the feed screw 213 moves within the toothed wheel in an axial direction and the coupling 217 moves in an axial direction with respect to the coupling 215.

Further, the sleeve 209 within the sleeve 210 in the gear box 200 moves in an axial direction to prevent the object to be controlled and control system from being damaged due to the abnormal thrust force.

In addition, a dog 231 is provided on the sleeve 209 to give instructions for stopping the control system so that the axial movement of the feed screw 213 may be transmitted to an instruction switch 232.

Thus, in this embodiment of the overload safety device of the present invention, axial movement of the feed screw 213 activates the instruction switch 232 to stop the control system.

As may be fully understood from the foregoing embodiments, the present invention has been developed for the purpose of stopping the control system simultaneously with occurrence of an overload and eliminating damage to the object to be controlled and the control system.

In addition, means for detecting overload instructions are provided in response to the movement of feed screw and feed nut which serve to move the object to be controlled.

Therefore, should an overload occur in the object to be controlled or should an overload occur as a result of forces remote from the object to be controlled the over-load may directly be detected and simultaneously therewith the control system may be stopped.

The safety device of the present invention has been designed so that when the overload is applied to the object to be controlled, the control system may be instructed to stop regardless of the position the system is in at the time the overload is applied.

The safety device has been further designed to accurately eliminate an overload applied to the object to be controlled, and to give stop instructions to the control system, in a short period of time.

Moreover, normalization of the control system after the overload has been removed can be accomplished without waste of time.

These problems have been thoughtfully taken into consideration in the provision of the present invention.

In accordance with the safety device of the invention, the feed screw and feed nut may be displaced in an axial direction as a result of an overload, so that such an abnormal load is scarcely applied to the control system, the object to be controlled and external parts to carry out the stoppage of the control system, thus preventing damage to such elements as slide surfaces, the control system, etc. and, thus providing a system of great durability.

Although the invention has been described and illustrated in detail, it is to be clearly understood that the same is by way of illustration and example only and is not to be taken by way of limitation, the spirit and scope of this invention being limited only by the terms of the appended claims.

What is claimed is:
1. An overload safety device for a machine having a feed screw and a body comprising:
   a first sleeve mounted to said feed screw to move axially therewith relative to said body;
   a second sleeve slidably mounted to the outer periphery of said first sleeve and the inner periphery of said body;
   a first spring between said first and second sleeves biasing said first sleeve in a first axial direction relative to said second sleeve;
   a second spring between said second sleeve and said body biasing said second sleeve in an axial direction opposite said first axial direction; and
   a switch mounted to said body to detect movement of said feed screw and first sleeve in both axial directions.

2. The device of claim 1 wherein said first and second sleeves are mounted so as only said first sleeve moves in said opposite axial direction and both said first and second sleeve move in said first axial direction from a non-force position.

3. The device of claim 1 further including a control system responsive to said switch to stop the operation of said machine.

4. The device of claim 1 wherein said first sleeve includes a peripheral groove and said switch includes an element which lies in said groove in a non-force position.

* * * * *

UNITED STATES PATENT OFFICE
CERTIFICATE OF CORRECTION

PATENT NO. : 3,968,705
DATED : July 13, 1976
INVENTOR(S) : Hitoshi Amano and Yoshifumi Tsuchiya It is certified that error appears in the above–identified patent and that said Letters Patent are hereby corrected as shown below:

On the cover sheet, please insert on the next line after "Appln. No.: 540,243":

FOREIGN APPLICATION PRIORITY DATA

Oct. 24, 1974   Japan..........49-122746

Signed and Sealed this

Twelfth Day of October 1976

[SEAL]

Attest:

RUTH C. MASON
Attesting Officer

C. MARSHALL DANN
Commissioner of Patents and Trademarks